(12) United States Patent
Park et al.

(10) Patent No.: US 12,452,866 B2
(45) Date of Patent: Oct. 21, 2025

(54) METHOD AND APPARATUS FOR TRANSMITTING AND RECEIVING UPLINK CONTROL DATA IN NEXT GENERATION WIRELESS NETWORK

(71) Applicant: KT CORPORATION, Gyeonggi-do (KR)

(72) Inventors: Kyujin Park, Seoul (KR); Woo-Jin Choi, Seoul (KR)

(*) Notice: Subject to any disclaimer, the term of this patent is extended or adjusted under 35 U.S.C. 154(b) by 0 days.

(21) Appl. No.: 17/543,675

(22) Filed: Dec. 6, 2021

(65) Prior Publication Data

US 2022/0095300 A1 Mar. 24, 2022

Related U.S. Application Data

(63) Continuation of application No. 16/461,640, filed as application No. PCT/KR2017/013045 on Nov. 16, 2017, now Pat. No. 11,240,785.

(30) Foreign Application Priority Data

Nov. 16, 2016 (KR) .................. 10-2016-0152587
Nov. 16, 2017 (KR) .................. 10-2017-0153125

(51) Int. Cl.
*H04W 72/21* (2023.01)
*H04B 1/713* (2011.01)
(Continued)

(52) U.S. Cl.
CPC ............ *H04W 72/21* (2023.01); *H04B 1/713* (2013.01); *H04L 5/00* (2013.01); *H04W 72/04* (2013.01);
(Continued)

(58) Field of Classification Search
None
See application file for complete search history.

(56) References Cited

U.S. PATENT DOCUMENTS 11,240,785 B2 * 2/2022 Park ..................... H04B 1/713
2013/0294353 A1 11/2013 Han et al.
(Continued)

FOREIGN PATENT DOCUMENTS

WO WO-2018204730 A1 * 11/2018 ........... H04L 1/0013

OTHER PUBLICATIONS

LG Electronics, "Design of one-symbol UL control channel for NR", R1-1611842, 3GPP TSG RAN WG1 Meeting #87, Reno, USA, Nov. 14-18, 2016.
(Continued)

*Primary Examiner* — Anh Vu H Ly
(74) *Attorney, Agent, or Firm* — Invenstone patent LLC

(57) ABSTRACT

Provided is a method for a terminal for transmitting uplink control data. The method includes receiving, from a base station, at least one of UL control channel resource set configuration information and UL control channel transmission information, configuring an UL control channel including the UL control information based on at least one of the UL control channel resource set configuration information and the UL control channel transmission information, and transmitting the UL control channel to the base station. The UL control channel is configured with one or more UL control channel formats based on the number of symbols that configure the UL control channel.

23 Claims, 8 Drawing Sheets

(51) Int. Cl.
*H04L 5/00* (2006.01)
*H04W 72/04* (2023.01)
*H04W 72/0446* (2023.01)
*H04W 72/0453* (2023.01)
*H04W 72/56* (2023.01)
*H04W 80/08* (2009.01)
*H04W 88/02* (2009.01)
*H04J 11/00* (2006.01)
*H04W 4/70* (2018.01)

(52) U.S. Cl.
CPC ... *H04W 72/0446* (2013.01); *H04W 72/0453* (2013.01); *H04W 72/56* (2023.01); *H04W 80/08* (2013.01); *H04W 88/02* (2013.01); *H04J 11/0036* (2013.01); *H04W 4/70* (2018.02)

(56) References Cited

U.S. PATENT DOCUMENTS

| | | | |
|---|---|---|---|
| 2015/0341864 A1 | 11/2015 | Yang et al. | |
| 2017/0164352 A1 | 6/2017 | Yang et al. | |
| 2018/0076917 A1* | 3/2018 | Pan | H04B 7/0639 |
| 2018/0097609 A1 | 4/2018 | Tiirola et al. | |
| 2018/0124815 A1 | 5/2018 | Papasakellariou et al. | |
| 2018/0132264 A1* | 5/2018 | Jung | H04W 72/54 |
| 2018/0227949 A1* | 8/2018 | Tiirola | H04L 27/26035 |
| 2018/0279291 A1* | 9/2018 | Tiirola | H04L 25/0224 |
| 2018/0302916 A1 | 10/2018 | Lee et al. | |
| 2018/0324788 A1* | 11/2018 | Choi | H04L 5/0053 |
| 2018/0331807 A1 | 11/2018 | Kim et al. | |
| 2018/0338302 A1 | 11/2018 | Han et al. | |
| 2019/0007175 A1 | 1/2019 | Kwak et al. | |
| 2019/0123881 A1 | 4/2019 | Lee et al. | |
| 2019/0132102 A1 | 5/2019 | Kwak et al. | |
| 2019/0141700 A1 | 5/2019 | Kwak et al. | |
| 2019/0261383 A1* | 8/2019 | Kwak | H04W 72/0446 |
| 2019/0296879 A1 | 9/2019 | Kwak et al. | |
| 2019/0364558 A1* | 11/2019 | Kim | H04W 72/0446 |
| 2020/0068557 A1 | 2/2020 | Lee et al. | |
| 2020/0153600 A1 | 5/2020 | Tiirola et al. | |
| 2020/0366417 A1* | 11/2020 | Lei | H04L 1/1685 |

OTHER PUBLICATIONS

Huawei et al., "Discussion on sPUCCH design", R1-1611160, 3GPP TSG RAN WG1 Meeting #87, Reno, USA, Nov. 14-18, 2016.
European Patent Office, Extended European Search Report of corresponding EP Patent Application No. 17871249.3, May 7, 2020.
Samsung, "UL Control Channel Design", R1-1612529, 3GPP TSG RAN WG1 #87, Reno, USA, Nov. 14-18, 2016, pp. 1-4.
Huawei et al., "UCI on sPUSCH", R1-1608639, 3GPP TSG RAN WG1 Meeting #86bis, Lisbon, Portugal, Oct. 10-14, 2016, pp. 1-8.
LG Electronics, "Overall structure of UL control channel for NR", R1-1611840, 3GPP TSG RAN WG1 Meeting #87, Reno, USA Nov. 14-18, 2016, pp. 1-6.
Intel Corporation, "UCI contents and UL control channel formats", R1-1609536, 3GPP TSG-RAN WG1 #86bis, Lisbon, Portugal, Oct. 10-14, 2016, pp. 1-6.

* cited by examiner 2-symbol short PUCCH

NR-PUCCH in short duration

METHOD AND APPARATUS FOR TRANSMITTING AND RECEIVING UPLINK CONTROL DATA IN NEXT GENERATION WIRELESS NETWORK

CROSS REFERENCE TO RELATED APPLICATION

This application is a continuation of U.S. application Ser. No. 16/461,640 filed on May 16, 2019, which is a National Stage Patent Application of PCT International Patent Application No. PCT/KR2017/013045 filed on Nov. 16, 2017 under 35 U.S.C. § 371, which claims priority to Korean Patent Application No. 10-2016-0152587 filed on Nov. 16, 2016, and No. 10-2017-0153125 filed on Nov. 16, 2017, the teachings of which are incorporated herein in their entireties by reference.

TECHNICAL FIELD

The present disclosure relates to methods for transmitting and receiving uplink control information for a next-generation/5G radio access network (hereinafter, referred to as "new radio" (NR) that is under discussion in the 3rd generation partnership project (3GPP).

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). In the NR, It is required to design not only to improve a data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

Thus, a specific procedure is required for the flexible channel structure and uplink/downlink transmission for satisfying requirements of various usage scenarios using limited radio resources. In particular, in order for a user equipment to transmit uplink control information to a base station, methods are needed for satisfying requirements of each scenario by configuring various channel structures.

DETAILED DESCRIPTION OF THE INVENTION

Technical Problem

In accordance with embodiment of the present disclosure to address such issues, methods are provided i) for configuring a flexible uplink control channel for satisfying requirements of various usage scenarios, and ii) for enabling a user equipment to transmit uplink control information using the uplink control channel, for satisfying requirements of each usage scenario.

Technical Solution

In accordance with an aspect of the present disclosure, a method of a user equipment is provided for transmitting uplink control information. The method includes: receiving at least one of uplink control channel resource set configuration information and uplink control channel transmission information from a base station, configuring an uplink control channel including the uplink control information based on at least one of the uplink control channel resource set configuration information and the uplink control channel transmission information, and transmitting the uplink control channel to the base station. The uplink control channel is configured with one or more uplink control channel formats classified based on the number of symbols that configure the uplink control channel.

In accordance with another aspect of the present disclosure, a method of a base station is provided for receiving uplink control information. The method includes: configuring at least one of uplink control channel resource set configuration information and uplink control channel transmission information for a user equipment, transmitting at least one of the uplink control channel resource set configuration information and the uplink control channel transmission information, and receiving an uplink control channel configured to include the uplink control information based on at least one of the uplink control channel resource set configuration information and the uplink control channel transmission information. The uplink control channel is configured with one or more uplink control channel formats classified based on the number of symbols that configure the uplink control channel.

In accordance with still another aspect of the present disclosure, a user equipment is provided for transmitting uplink control information. The user equipment includes: a receiver receiving at least one of uplink control channel resource set configuration information and uplink control channel transmission information from a base station, a controller configuring an uplink control channel including the uplink control information based on at least one of the uplink control channel resource set configuration information and the uplink control channel transmission information, and a transmitter transmitting the uplink control channel to the base station. The uplink control channel is configured with one or more uplink control channel formats classified based on the number of symbols that configure the uplink control channel.

In accordance with yet another aspect of the present disclosure, a base station is provided for receiving uplink control information. The base station includes: a controller configuring at least one of uplink control channel resource set configuration information and uplink control channel transmission information for a user equipment, a transmitter transmitting at least configured one of the uplink control channel resource set configuration information and the uplink control channel transmission information, and a receiver receiving an uplink control channel configured to include the uplink control information based on at least one of the uplink control channel resource set configuration information and the uplink control channel transmission information. The uplink control channel is configured with one or more uplink control channel formats classified based on the number of symbols that configure the uplink control channel.

Effects of the Invention

In accordance with embodiments of the present disclosure, in networks deployed with one or more service scenarios, it is possible to satisfy requirements of each service and to enable a user equipment to transmit uplink control information by efficiently using radio resources.

BEST MODE FOR CARRYING OUT THE INVENTION

Figure 1:
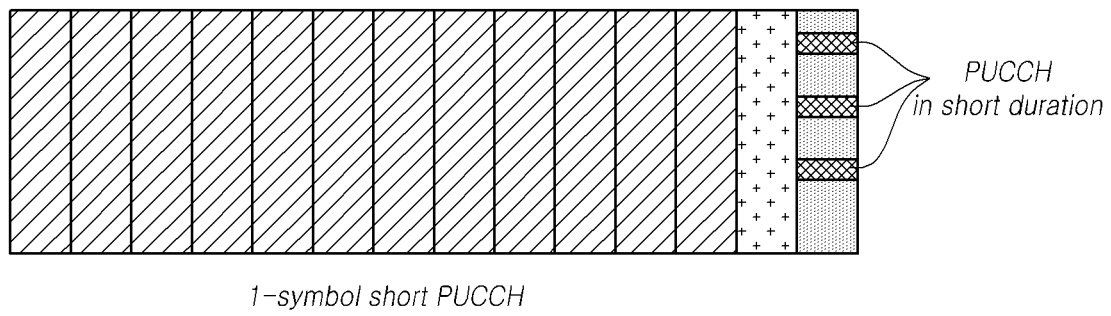
FIG. 1 is a diagram illustrating an uplink control channel configured with 1 symbol according to embodiments of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be classified into two categories. 1) The base station may be referred to an apparatus that forms a corresponding communication service area, such as a megacell, a macrocell, a microcell, a picocell, a femtocell, and a small cell, and provides a communication service within the corresponding communication service area, or 2) the base station may be referred to a communication service area. In the case of 1), the base station may be referred to i) apparatuses that are controlled by the same entity by forming any corresponding communication service area and providing a communication service within the corresponding communication service, or ii) apparatus that interact and cooperate with each other for forming a corresponding communication service area and providing a communication service within the corresponding communication service area. According to communication schemes employed by a base station, the base station may be referred to as a point, a transmission/reception point, a transmission point, a reception point, or the like. In case of 2), the base station may be a communication service area itself where UEs able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station are two entities for performing transmission/reception used to embody the technology and technical spirit described in the present specification. The UE and the base station are a generic term and not limited to specific terms or words.

Herein, the uplink (hereinafter, referred to as "UL") refers to data transmission/reception by a UE to/from a base station, and the downlink (hereinafter, referred to as "DL") refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE and a receiver may be a part of multiple transmission/reception points.

Hereinafter, transmission and reception of a signal through a channel such as the PUCCH, the PUSCH, the PDCCH, or the PDSCH, may be described as the transmission and reception of the channel, such as the PUCCH, the PUSCH, the PDCCH, or the PDSCH.

Meanwhile, higher layer signaling includes radio resource control (RRC) signaling transmitting RRC information containing an RRC parameter.

The base station performs DL transmission to UEs. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments of the present disclosure may be applied to resource allocation in asynchronous wireless communication evolving into LTE/LTE-advanced and IMT-2020 from GSM, WCDMA, and HSPA, synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC device of the present disclosure may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims to improve an indoor coverage, to support for large-scale low-speed terminals, to lower latency sensitivity, to reduce terminal costs, to lower power consumption, and to optimize a network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a subframe, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

Meanwhile, in the present disclosure, an uplink control channel defined for UCI transmission/reception corresponding to a PUCCH in the LTE is described as an NR PUCCH, but the embodiments of the present disclosure are not limited thereto.

NR (New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR).

The NR is required to be designed not only to improve a data transmission rate as compared with the long term evolution (LTE)/LTE-Advanced, but also to meet various requirements per detailed and specific usage scenario. An enhanced mobile broadband (eMBB), massive machine-type communication (mMTC), and ultra-reliable and low latency communication (URLLC) are proposed as representative usage scenarios of the NR. In order to meet the requirements per usage scenario, it is required for designing the NR to have flexible frame structures, compared with the LTE/LTE-Advanced.

Specifically, the eMBB, mMTC, URLLC are considered as representative usage scenarios of the NR by the 3GPP. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an arbitrary NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

An UL Control Channel for a Next Generation Radio Access Network

An UL control channel is required for enabling a UE to transmit control information to a base station. As described above, it is noted that in the NR, a flexible channel structure is required for satisfying various service scenarios. In consideration of such circumstances, an UL control channel for transmitting/receiving UL control information (UCI) in the NR may contain one or more symbols therein. For example, as shown in FIG. 1 to 3, the UL control channel may be configured with one or more symbols.

FIG. 1 is a diagram illustrating an UL control channel configured with one symbol according to embodiments of the present disclosure. FIG. 2 is a diagram illustrating an UL control channel configured with two symbols according to embodiments of the present disclosure.

For example, as shown in FIG. 1, an NR PUCCH may be configured to have a short duration for enabling the UCI which is transmitted/received through one UL symbol. That is, the UL control channel may be configured with one symbol, and this may be transmitted through an UL control region. In frequency domain, the UL control channel may be configured depending on configurations. A plurality of UL control channel sets may be configured, and a UE may selectively use one or more of the UL control channel sets according to an indication of a base station.

Figure 2:
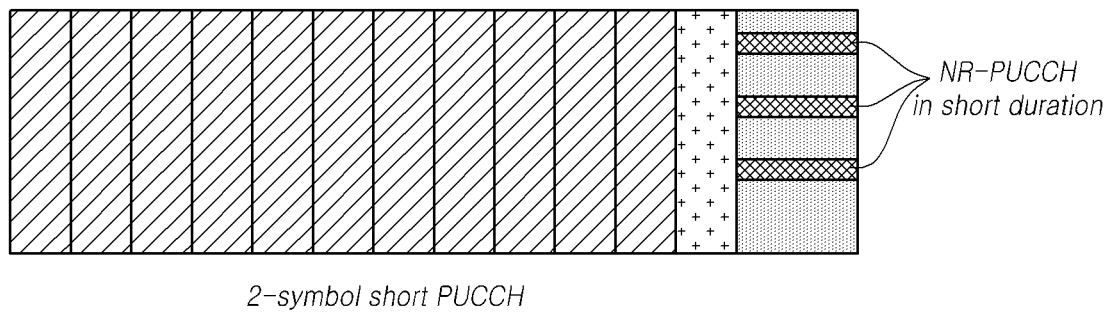
FIG. 2 is a diagram illustrating an uplink control channel configured with 2 symbols according to embodiments of the present disclosure.
Figure 3:
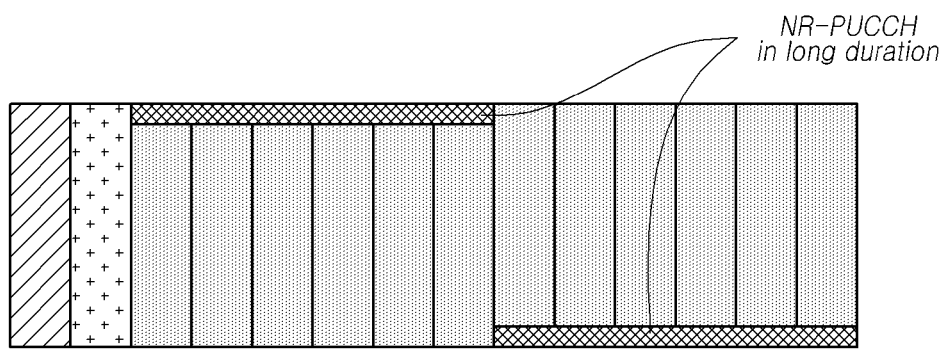
FIG. 3 is a diagram illustrating an uplink control channel configured with 6 symbols according to embodiments of the present disclosure.

For another example, as shown in FIG. 2, an NR PUCCH may be configured with two symbols. In this case, in frequency domain, the UL control channel may be configured depending on configurations. A plurality of UL control channel sets may be configured, and a UE may selectively use one or more of the UL control channel sets according to an indication of a base station.

An UL control channel configured with the number of UL control channel symbols (one or two) shown in FIGS. 1 and 2 is described and discussed as a short PUCCH. The short PUCCH is merely for distinguishing from a long PUCCH which is an UL control channel configured with four or more symbols. However, embodiments of the present disclosure are not limited to these terms.

FIG. 3 is a diagram illustrating an UL control channel configured with six symbols according to embodiments of the present disclosure.

Referring to FIG. 3, an NR PUCCH may be configured with a plurality of symbols (e.g., the number of symbols greater than and equal to a pre-configured number of symbols). For example, the NR PUCCH may be configured with six symbols. Alternatively, the number of symbols may be determined as a natural number greater than or equal to two or four.

That is, the NR PUCCH may be classified into the short PUCCH configured with one or two symbols and the long PUCCH configured with four or more symbols. The PUCCH may also be classified based on PUCCH formats.

Meanwhile, in the NR, the UL control channel may support the following two types of transmission.

For one example, the UL control channel may be transmitted through the short PUCCH in one or more last UL symbols transmitted in one symbol. In this case, an UL data channel in one symbol may be processed in an FDM method and/or a TDM method. To this end, it is necessary to provide a technology for processing a potential gap at the end portion of a corresponding slot. For another example, the UL control channel may be transmitted through another symbol (e.g., one or more symbols at the beginning portion of one slot). For further another example, the UL control channel may be transmitted through the long PUCCH by multiple UL symbols for enhanced coverage. In this case, an UL data channel in one symbol may be processed in the FDM method. However, a technology is further required for the multiplexing of a sounding reference signal (SRS).

Meanwhile, in case frequency hopping is applied, the frequency hopping is not performed beyond a carrier bandwidth. In addition, in frequency domain, one or multiple physical resource blocks (PRB) may be a size of a minimum resource unit for the UL control channel. In addition, a UE-specific reference signal may be used for transmitting UL control channel.

As described above, in accordance with embodiments of the present disclosure, a method of a UE and a device are provided for transmitting UL control information through a UL control channel in a next generation radio access network for satisfying requirements of various service scenarios. For example, two types (or formats) of NR PUCCH each having a different duration from the other are defined in time domain, and, for each type, a method for configuring one or more UL control channel resources, and a specific transmission method are discussed according to embodiments.

Hereinafter, for convenience of description and ease of understanding, an NR PUCCH having a long duration, i.e. configured with four or more symbols, is referred to as a long PUCCH format and an NR PUCCH having a short duration is referred to as a short PUCCH format. The embodiments of the present disclosure are not limited to the terms, and various PUCCH formats may be defined. For example, it is possible to define a plurality of PUCCH formats having a short duration and a plurality of PUCCH formats having a long duration.

In addition, the PUCCH format may be also classified based on a payload size of the UL control information. For example, a plurality of different PUCCH formats from one another may be configured based on a payload size of UL control information for each duration. That is, in configuring the NR PUCCH format, along with the classification (long PUCCH and short PUCCH) according to the PUCCH duration, the PUCCH format may be configured according to the UCI payload size to be transmitted by a UE through each PUCCH.

Hereinafter, the PUCCH format will be described for each of the long PUCCH and the short PUCCH classified according to the duration. As described above, the PUCCH format may be further classified by an UCI payload size.

Thus, a method is provided for allocating resources for each PUCCH format in an NR subframe, a slot, or a mini-slot when two NR PUCCH formats are defined based on different time durations. In addition, a method is provided for configuring an NR PUCCH format for transmitting a corresponding UCI when a UE transmits a UCI (e.g., hybrid automatic repeat request (HARD) ACK/NACK, channel state information (CSI), scheduling request (SR) etc.) in the NR subframe, the slot, or the mini-slot. Accordingly, methods are provided i) for configuring one or more NR PUCCH resources for each format and ii) for transmitting UCI for each NR UE, in the NR subframe, the slot, or the mini-slot.

Figure 4:
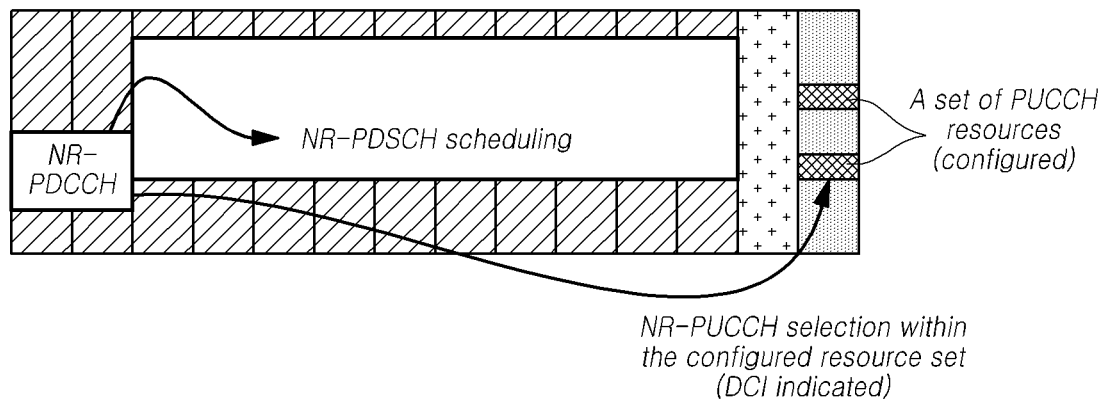
FIG. 4 is a diagram illustrating an uplink control channel configured using a downlink control channel according to embodiments of the present disclosure.

FIG. 4 is a diagram illustrating an UL control channel configured using a DL control channel according to embodiments of the present disclosure.

Referring to FIG. 4, a PUCCH resource set may be configured for a UE. When the UE transmits UL control information, the UE may transmit the information to a base station through a PUCCH which is scheduled by a PDCCH. In this case, the UE may transmit the UL control information to the base station using one of PUCCH resource sets indicated by the PDCCH. To this end, the UE may receive PUCCH resource set configuration information from the base station.

In the present disclosure, UL control region configuration information may have the same meaning of PUCCH resource set configuration information. That is, the UL control region configuration information and the PUCCH resource set configuration information mean information on one or more PUCCH resources needed for enabling a UE to transmit an UL control channel which is received from a base station. Accordingly, an UL control channel resource set and an UL control region may be identical in meaning.

Figure 5:
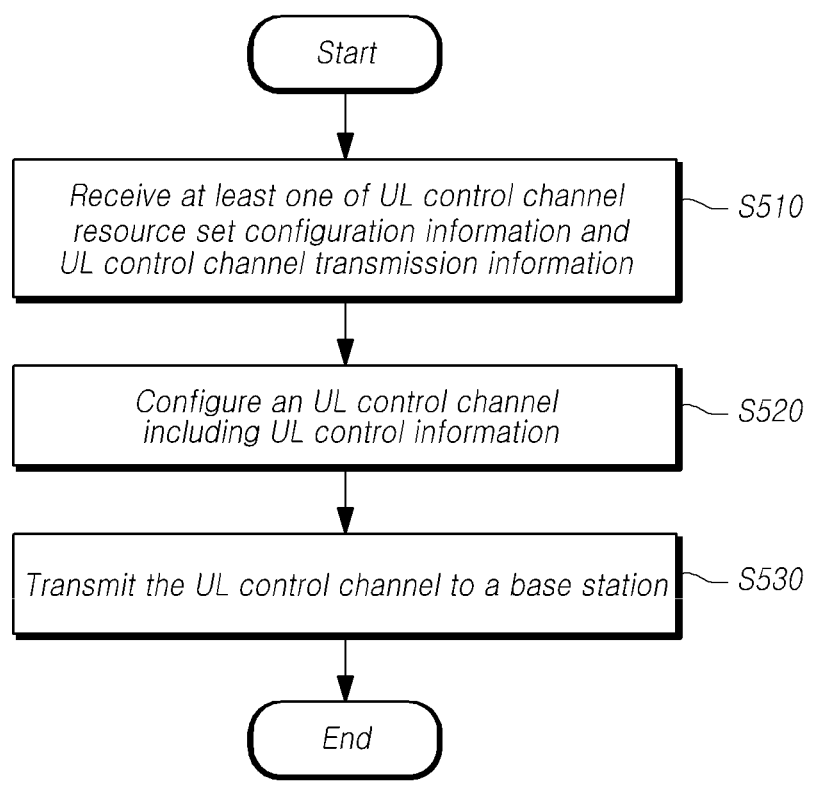
FIG. 5 is a flowchart illustrating operation of a user equipment according to embodiments of the present disclosure.

FIG. 5 is a flowchart illustrating operation of a UE according to embodiments of the present disclosure.

Referring to FIG. 5, the UE may perform operations for receiving, from a base station, at least one of an UL control channel resource set configuration information and UL control channel transmission information at step S510.

For example, the UL control channel resource set configuration information may include at least one of UL control channel transmission type setting information and frequency resource allocation information of an UL control channel. The UL control channel transmission type setting information may include information on whether frequency hopping is performed for each UL control channel format and may be classified into a localized type and a distributed type. The localized transmission type means UL control information transmission through one or more consecutive localized PRBs on which frequency hopping is not performed. The distributed transmission type means UL control information transmission through frequency hopping applied on a symbol or a symbol group basis. In addition, the frequency resource allocation information of the UL control channel may include at least one of UL control channel format information and PRB allocation information for each UL control channel format.

For another example, the UL control channel transmission information may include at least one of UL control channel format information, UL control channel transmission type information, and priority information for each UL control channel format, configured for each UE. The UL control channel format information means information on a PUCCH format including the long PUCCH and the short PUCCH. The UL control channel transmission type information may mean information for indicating which of the distributed type and the localized type is applied. Further, the priority information for each UL control channel format means information for determining a format having a top priority which can be used when a UE transmits UL control information, in case both the long PUCCH and the short PUCCH are configured for the UE. The UE may transmit UL control information using a PUCCH format having a top priority.

Meanwhile, the UL control channel resource set configuration information may be received in advance for enabling the UE to transmit an UL control channel. For example, the UL control channel resource set configuration information may be received through at least one of cell-specific high layer signaling, UE-specific high layer signaling, and a common search space of a DL control channel. The UE may recognize radio resource information for enabling the UE to transmit UL control information using the received UL control channel resource set configuration information. The UL control channel resource set configuration information may be configured cell-specifically and received by the UE.

The UL control channel transmission information may be received together with or separately from the UL control channel resource set configuration information. The UL control channel transmission information may be received through the UE-specific high layer signaling or the common search space of the DL control channel. That is, the UL control channel transmission information may be configured UE-specifically and received by the UE.

Through such a manner, the UE may recognize information on a control region for transmitting an UL control channel, and a PUCCH format, a transmission type, priority information, and the like, configured for the UE.

The UE may perform operations for configuring an UL control channel including UL control information based on at least one of the UL control channel resource set configuration information and the UL control channel transmission information at step S520. For example, when the UE is required to transmit UL control information to a base station, the UE may configure an UL control channel for transmitting the UL control information using the information received in the step S510.

For one example, the UE may transmit the UL control information using a PUCCH format configured for the UE in an allocated UL control region.

For another example, when an UL control region for an UL control channel format configured for the UE is not allocated, the UE may configure an UL control channel through an UL control region for another UL control channel format having a resource index identical to an UL control channel resource index based on the set UL control channel format. For example, an UL control region configured with four or more symbols for transmitting an UL control channel using the long PUCCH format may not be allocated even when the long PUCCH format is set for the UE. In this case, the UE may configure an UL control channel using an UL control region for the short PUCCH format having a resource index identical to an UL control channel resource index for transmitting an UL control channel using the long PUCCH format.

For another example, the UE may configure the UL control channel using an UL control channel format having a top priority based on priority information for each UL control channel format. When an UL control region for the UL control channel format having the top priority is not allocated, the UE may configure the UL control channel using an UL control channel format having a second priority. For example, the UE may determine an UL control channel format and configure the UL control channel depending on a priority set for the UE using priority information for each UL control channel format.

Meanwhile, as described above, the UL control channel may be classified into one or more formats based on the number of symbols contained in the UL control channel, as one criterion. For one example, i) an UL control channel configured with one symbol or two symbols and ii) an UL control channel configured with four or more symbols may be each configured with a different format from the other. For another example, the UL control channel format may be classified into based on a payload size of UL control information, as another criterion. That is, the UL control channel format may include i) a format configured with two or less UL control channel transmission symbols and ii) a format configured with four or more UL control channel transmission symbols, transmitted through a single slot, or may be classified into based on a payload size of UL control information.

The UE may perform operations for transmitting the UL control channel to the base station at step S530. The UE may transmit the UL control information through the configured UL control channel.

Through such operations, the UE may receive information on the UL control region (UL control channel resource set) and the UL control channel, and transmit the UL control information to the base station. Thus, the UE can satisfy requirements of each service using various UL control channel formats.

Figure 6:
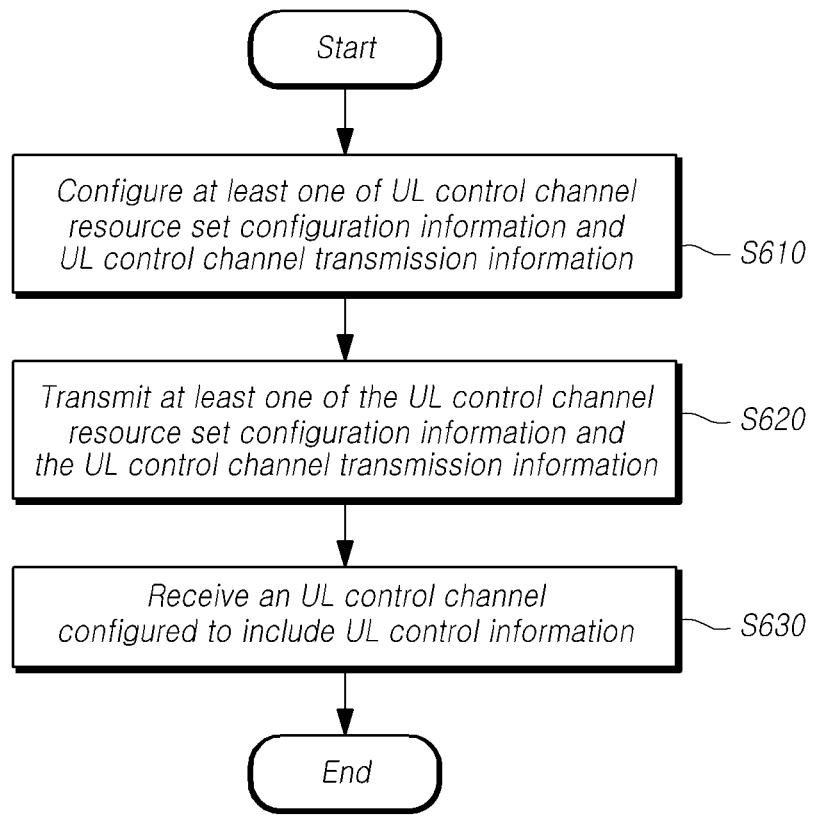
FIG. 6 is a flowchart illustrating operation of a base station according to embodiments of the present disclosure.

FIG. 6 is a flowchart illustrating operation of a base station according to embodiments of the present disclosure.

Referring to FIG. 6, the base station may perform operations for configuring at least one of i) UL control channel resource set configuration information and ii) UL control channel transmission information, for a UE at step S610. The base station may configure information for enabling the UE to transmit an UL control channel.

For example, the UL control channel resource set configuration information may include at least one of UL control channel transmission type setting information and frequency resource allocation information of the UL control channel. The UL control channel transmission type setting information may include information on whether frequency hopping is performed for each UL control channel format, or the UL control channel transmission type setting information may be classified into a localized type and a distributed type. The localized transmission type means UL control information transmission through one or more consecutive localized PRBs on which frequency hopping is not performed. The distributed transmission type means UL control information transmission through frequency hopping applied on a symbol or a symbol group basis. In addition, the frequency resource allocation information of the UL control channel may include at least one of UL control channel format information and PRB allocation information for each UL control channel format.

For another example, the UL control channel transmission information may include at least one of UL control channel format information, UL control channel transmission type information, and priority information for each UL control channel format, configured for each UE. The UL control channel format information means information on a PUCCH format including the long PUCCH and the short PUCCH. The UL control channel transmission type information may mean information for indicating which of the distributed type and the localized type is applied. Further, the priority information for each UL control channel format means information for determining a format having a top priority which can be used when a UE transmits UL control information, in case both the long PUCCH and the short PUCCH are configured for the UE. The UE may transmit UL control information using a PUCCH format with a top priority.

The base station may perform operations for transmitting at least one of the UL control channel resource set configuration information and the UL control channel transmission information at step S620.

For example, the UL control channel resource set configuration information may be transmitted in advance for enabling the UE to transmit an UL control channel. For example, the UL control channel resource set configuration information may be transmitted through at least one of cell-specific high layer signaling, UE-specific high layer signaling, and a common search space of a DL control channel. The UE may recognize radio resource information for enabling the UE to transmit UL control information using the received UL control channel resource set configuration information. The UL control channel resource set configuration information may be configured cell-specifically and transmitted to the UE.

For another example, the UL control channel transmission information may be transmitted together with or separately from the UL control channel resource set configuration information. The UL control channel transmission information may be transmitted through the UE-specific high layer signaling or the common search space of the DL control channel. That is, the UL control channel transmission information may be configured UE-specifically and transmitted to the UE.

Through such a manner, the UE may recognize information on a control region (UL control channel resource set) for transmitting an UL control channel, and a PUCCH format, a transmission type, priority information, and the like, configured for the UE.

The base station may perform operations for receiving an UL control channel including UL control information based on at least one of the UL control channel resource set configuration information and the UL control channel transmission information at step S630. For example, when the UE is required to transmit the UL control information to a base station, the UE may configure the UL control channel for transmitting the UL control information using the information received in the step S620.

For one example, the UE may transmit the UL control information using a PUCCH format configured for the UE in an allocated UL control region, and then the base station may receive this.

For another example, when an UL control region for an UL control channel format configured for the UE is not allocated, the UE may configure an UL control channel through an UL control region for another UL control channel format having a resource index identical to an UL control channel resource index based on the set UL control channel format. For example, an UL control region configured with four or more symbols for transmitting an UL control channel using the long PUCCH format may not be allocated even when the long PUCCH format is set for the UE. In this case, the UE may configure the UL control channel using an UL control region for the short PUCCH format having a resource index identical to an UL control channel resource index for transmitting an UL control channel using the long PUCCH format.

For another example, the UE may configure the UL control channel using an UL control channel format having a top priority based on priority information for each UL control channel format. When an UL control region for the UL control channel format having the top priority is not allocated, the UE may configure the UL control channel using an UL control channel format having a second priority. For example, the UE may determine an UL control channel format and configure an UL control channel depending on a priority set for the UE using priority information for each UL control channel format.

Meanwhile, as described above, the UL control channel may be classified into one or more formats based on the number of symbols contained in the UL control channel, as one criterion. For one example, each of an UL control channel configured with one symbol or two symbols and an UL control channel configured with four or more symbols may be configured with a different format from the other. For another example, the UL control channel format may be classified into based on a payload size of UL control information, as another reference. That is, the UL control channel format may include a format configured with two or less UL control channel transmission symbols and a format configured with four or more UL control channel transmission symbols, transmitted through a single slot, or may be classified into based on a payload size of UL control information.

The base station may receive, through a corresponding channel, the UL control information which is transmitted by the UE through the UL control channel configured using the method described above.

Hereinafter, embodiments of configuring an UL control region described above and embodiments of transmitting UL control information by each UE through the UL control region will be discussed in detail.

Hereinafter, UL control channel resource set configuration information may be referred to as UL control region configuration information as a meaning of configuration information for a resource region transmitting an UL control channel. Accordingly, it should be considered that the UL control channel resource set configuration information below is interpreted into the same meaning as the UL control channel resource set configuration information described above.

An Embodiment of Resource Allocation for Configuring an UL Control Region

An NR cell/base station may establish an UL control region for transmitting UCI of a UE in the corresponding cell and may explicitly signal UL control region configuration information (the UL control channel resource set configuration information described above) for UEs in the cell. In this case, the UL control region configuration information may include at least one of i) transmission type setting information and ii) frequency resource allocation information, for each NR PUCCH format.

For example, in an NR system, in addition to the long PUCCH format and the short PUCCH format which are classified based on the time duration described above, each NR PUCCH format may be classified into a) a localized transmission type for maximizing a frequency selective scheduling gain and b) a distributed transmission type for maximizing a frequency diversity gain. The localized transmission type in each of the long PUCCH format and the short PUCCH format may be an NR PUCCH transmission type for performing UCI transmission through one or more consecutive localized PRBs on which frequency hopping is not performed. The distributed transmission type may be an NR PUCCH transmission type to which frequency hopping is applied on a per-symbol or a per-symbol group basis, or an NR PUCCH transmission type for performing UCI transmission through distributed PRBs.

It should be considered that, in defining the PUCCH transmission type, each of the long PUCCH format and the short PUCCH format may be set to both the localized transmission type and the distributed transmission type, and, as described above, the corresponding transmission type setting information may be included in UL control region configuration information for each NR PUCCH format.

Alternatively, the transmission type may be defined and set only for a specific PUCCH format. For example, the long PUCCH format may always be set to only the distributed transmission type through frequency hopping (or distributed PRBs), and the short PUCCH format may be set to either the localized transmission type or the distributed transmission type by a base station. On the contrary, the long PUCCH format may be set to either the localized transmission type or the distributed transmission type, and the short PUCCH format may be set to either the localized transmission type or the distributed transmission type, as a default value.

Meanwhile, the UL control region configuration information may include frequency resource allocation information. The frequency resource allocation information may be PRB allocation information for each NR PUCCH format.

In addition, the UL control region configuration information for each PUCCH format may be semi-statically configured and transmitted through cell-specific high layer signaling or UE-specific high layer signaling. Alternatively, the UL control region configuration information may be dynamically configured and transmitted through a DL L1/L2 control channel. In this case, in case dynamic allocation method through the L1/L2 control channel is applied, the UL control region configuration information may be configured and transmitted based on a unit of a radio frame, a subframe, or slot/mini-slot through a common search space of an NR PDCCH defined for each numerology or numerology specifically.

Through such a method, the UE may receive control region configuration information for transmitting an UL control channel.

An Embodiment of Transmitting UL Control Information for Each UE

An NR PUCCH format for transmitting UCI of the long PUCCH format or the short PUCCH format may be set for transmitting the UCI through a subframe, a slot, or a mini-slot for each UE. Further, a transmission type setting may be performed for a PUCCH format set additionally. In this case, the corresponding setting may be configured semi-statically through UE-specific higher layer signaling or configured dynamically through a L1/L2 control channel, for each UE.

Thus, when a UE is able to set an NR PUCCH format and a transmission type for transmitting UCI, an UL control region based on the PUCCH format may not be configured in a subframe, slot, or mini-slot configured for enabling the UE to transmit any UCI (e.g., HARQ ACK/NACK, CSI, SR etc.). For example, UL control region allocation based on the long PUCCH format may not performed by a base station in an UL slot for a UE configured to transmit HARQ ACK/NACK feedback information based on the long PUCCH format through the UL slot.

For one example, in case of not performing UL control region allocation based on a PUCCH format set for a UE in a time-domain unit (e.g., a subframe, a slot, or a mini-slot) configured to transmit any UCI in the UE, the UE may delay UL control information and transmit it through a first subsequent time-domain unit after the UL control region allocation based on the PUCCH format set for the UE has been performed.

For another example, in case of not allocating the UL control region, the UE may not transmit the UL control information and drop it.

For further another example, in case of i) not performing UL control region allocation based on a PUCCH format set for a UE in a time-domain unit (e.g., a subframe, a slot, or a mini-slot) configured to enable the UE to transmit any UCI, but ii) performing UL control region allocation based on one or more other PUCCH formats, the UE may transmit corresponding UCI through a PUCCH resource having an identical resource index of UL control regions based on the one or more other PUCCH formats. More specifically, for a UE configured to transmit HARQ ACK/NACK feedback information based on the long PUCCH format, when an UL control region based on the long PUCCH format in a subframe for enabling the UE to transmit the HARQ ACK/NACK feedback information is not configured, but when an UL control region based on the short PUCCH format has been configured, the UE may transmit the HARQ ACK/NACK feedback information based on the short PUCCH format. That is, the UE may transmit the HARQ ACK/NACK feedback through a short PUCCH resource having a resource index identical to a PUCCH resource index based on the long PUCCH format allocated for the HARQ ACK/NACK feedback of the UE.

Meanwhile, each UE may configure i) UL control information configuration information based on the long PUCCH format and ii) UL control information configuration information based on the short PUCCH format through cell-specific high layer signaling or UE-specific high layer signaling. In this case, each UE may set a priority per PUCCH format to be used for transmitting any UCI. That is, a base station may set a PUCCH format having a high priority of the long PUCCH format and the short PUCCH format for transmitting any UCI for each UE and transmit through UE-specific higher layer signaling or an L1/L2 control channel. Thus, in case a UE is configured to transmit any UCI through a time-domain unit (e.g., a subframe/slot/mini-slot), the UE may transmit the UCI based on a PUCCH format configured with a higher priority for the UCI. That is, in the time-domain unit (e.g., a subframe/slot/mini-slot), in case both an UL control region based on the long PUCCH format and an UL control region based on the short PUCCH format are configured, or only an UL control region based on a PUCCH format having a high priority is configured, the UE may transmit corresponding UCI based on the PUCCH format having the high priority which is configured to transmit the UCI. In this case, in the time-domain unit (e.g., a subframe/slot/mini-slot), in case only an UL control region based on a PUCCH format having a second priority is configured, the UE may transmit the UCI based on the PUCCH format having the second priority.

As described above, each embodiment may be applicable alone, or any or all of each embodiment may be combined with any or all of one or more other embodiments. In addition, the numerology described above is classified based on a subcarrier spacing and a slot length. For example, the numerology may be classified into a numerology configured with a 15 khz subcarrier spacing and a numerology configured with a 60 khz subcarrier spacing. Further, the slot length may be changed depending on the subcarrier spacing.

As described above, according to the present disclosure, it is possible a UE and a base station to transmit and receive UL control information without an error using a plurality of PUCCH formats set in the next generation radio access network.

Hereinafter, structures of the UE and the base station for performing a part or all of each embodiment described above will be discussed with reference to the drawings.

Figure 7:
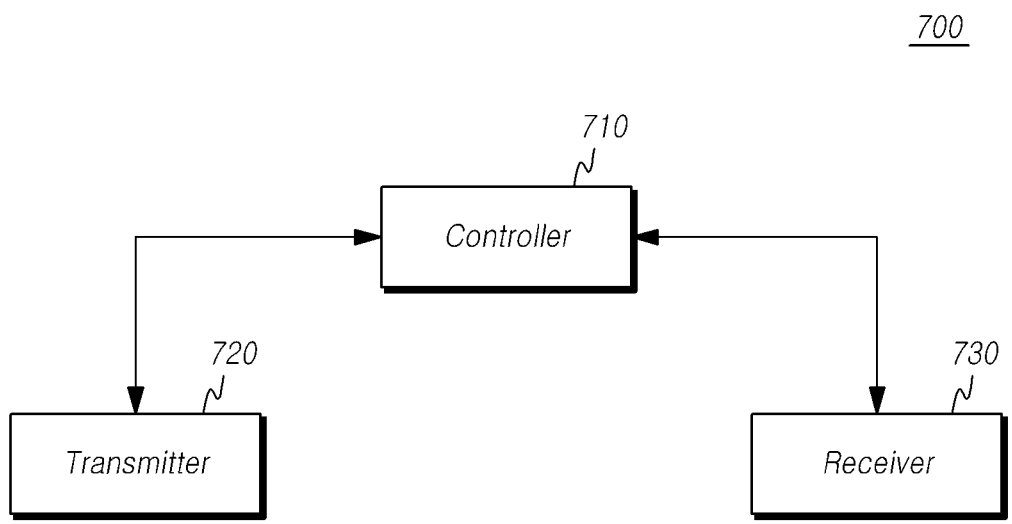
FIG. 7 is a block diagram illustrating a user equipment according to some embodiments of the present disclosure.

FIG. 7 is a block diagram illustrating a UE according to embodiments of the present disclosure.

Referring to FIG. 7, the UE 700 may include a receiver 730 receiving at least one of UL control channel resource set configuration information and UL control channel transmission information from a base station, a controller 710 configuring an UL control channel including UL control information based on at least one of the UL control channel resource set configuration information and the UL control channel transmission information, and a transmitter 720 transmitting the UL control channel to the base station.

For example, the UL control channel resource set configuration information may include at least one of i) UL control channel transmission type setting information and ii) frequency resource allocation information of the UL control channel. The UL control channel transmission type setting information may include information on whether frequency hopping is performed for each UL control channel format, and the UL control channel transmission type setting information may be classified into a localized type and a distributed type. The localized transmission type means UL control information transmission through one or more consecutive localized PRBs on which frequency hopping is not performed. The distributed transmission type means UL control information transmission through frequency hopping applied on a symbol or a symbol group basis. In addition, the frequency resource allocation information of the UL control channel may include at least one of UL control channel format information and PRB allocation information for each UL control channel format.

For another example, the UL control channel transmission information may include at least one of UL control channel format information, UL control channel transmission type information, and priority information for each UL control channel format, configured for each UE. The UL control channel format information means information on a PUCCH format including the long PUCCH and the short PUCCH. The UL control channel transmission type information may mean information for indicating which of the distributed type and the localized type is applied. Further, the priority information for each UL control channel format means information for determining a format having a top priority which can be used when a UE transmits the UL control information, in case both the long PUCCH and the short PUCCH are configured for the UE. The UE may transmit the UL control information using a PUCCH format having a top priority.

Meanwhile, the UL control channel resource set configuration information may be received in advance for enabling the UE to transmit the UL control channel. For example, the receiver 730 may receive the UL control channel resource set configuration information through at least one of cell-specific high layer signaling, UE-specific high layer signaling, and a common search space of a DL control channel.

The controller 710 may recognize radio resource information (e.g., PUCCH resource set information) for enabling the UE to transmit the UL control information using the received UL control channel resource set configuration information. The UL control channel resource set configuration information may be configured cell-specifically and received by the UE.

The UL control channel transmission information may be received together with or separately from the UL control channel resource set configuration information. The receiver 730 may receive the UL control channel transmission information through the UE-specific high layer signaling or the common search space of the DL control channel. That is, the UL control channel transmission information may be configured UE-specifically and received by the UE.

Meanwhile, the controller 710 may configure an UL control channel for transmitting the UL control information using the information.

For one example, the controller 710 may cause the UL control information to be transmitted using a PUCCH format set for the UE in an allocated UL control region.

For another example, in case of not allocating an UL control region for an UL control channel format configured for the UE, the controller 710 may configure the UL control channel through an UL control region for another UL control channel format having a resource index identical to an UL control channel resource index based on the set UL control channel format. For example, an UL control region configured with four or more symbols for transmitting the UL control channel using the long PUCCH format may not be allocated even when the long PUCCH format is set for the UE. In this case, the controller 710 may configure the UL control channel using an UL control region for the short PUCCH format which has a resource index identical to an UL control channel resource index for transmitting the UL control channel using the long PUCCH format.

For another example, the controller 710 may configure the UL control channel using an UL control channel format having a top priority based on priority information for each UL control channel format. In case of not allocating an UL control region for the UL control channel format having the top priority, the UE may configure the UL control channel using an UL control channel format having a second priority. For example, the controller 710 may determine an UL control channel format and configure the UL control channel depending on a priority set for the UE using priority information for each UL control channel format.

Meanwhile, as described above, the UL control channel may be classified into one or more formats based on the number of symbols contained in the UL control channel, as one criterion. For one example, each of an UL control channel configured with one symbol or two symbols and an UL control channel configured with four or more symbols may be configured with a different format from the other. For another example, an UL control channel format may be classified into based on a payload size of UL control information, as another criterion. That is, the UL control channel format may include a format configured with two or less UL control channel transmission symbols and a format configured with four or more UL control channel transmission symbols, transmitted through a single slot, or may be classified into based on a payload size of UL control information.

In addition, the controller 710 is configured to control the overall operations of the UE 700 for transmitting UCI using a plurality of PUCCH formats in the NR according to the embodiments of the present disclosure described above.

The transmitter 720 transmits the UL control information to the base station through the configured UL control channel.

In addition, the transmitter 720 and the receiver 730 are used to transmit, to the base station and receive from the base station, signals, messages, and data necessary for performing embodiments of the present disclosure.

Figure 8:
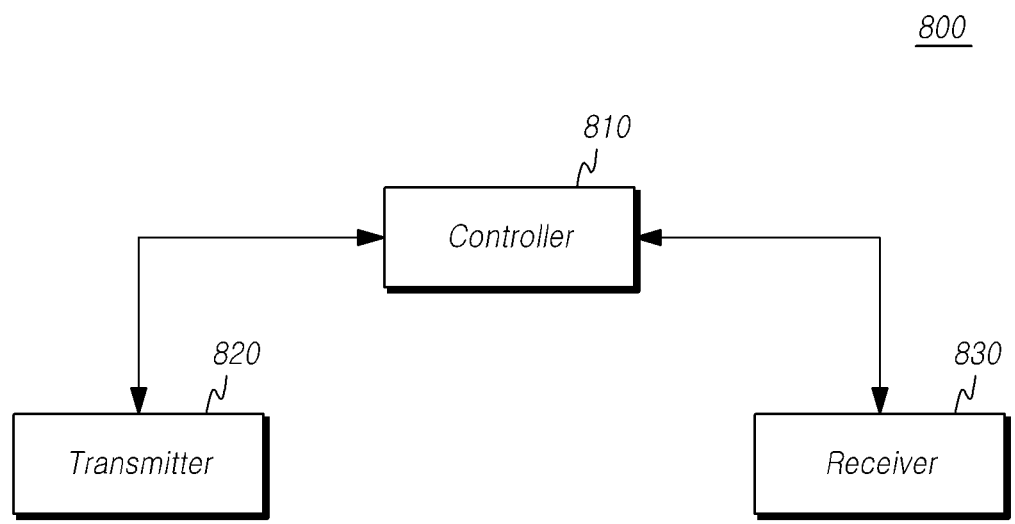
FIG. 8 is a block diagram illustrating a base station according to some embodiments of the present disclosure.

FIG. 8 is a block diagram illustrating a base station according to embodiments of the present disclosure.

Referring to FIG. 8, the base station 800 may include a controller 810 configuring at least one of UL control channel resource set configuration information and UL control channel transmission information for a UE, a transmitter 820 transmitting at least one of the UL control channel resource set configuration information and the UL control channel transmission information, and a receiver 830 receiving an UL control channel configured to include UL control information based on at least one of the UL control channel resource set configuration information and the UL control channel transmission information.

The controller 810 may configure information for enabling the UE to transmit the UL control channel.

For example, the UL control channel resource set configuration information may include at least one of UL control channel transmission type setting information and frequency resource allocation information of the UL control channel. The UL control channel transmission type setting information may include information on whether frequency hopping is performed for each UL control channel format, and the UL control channel transmission type setting information may be classified into a localized type and a distributed type. The localized transmission type means UL control information transmission through one or more consecutive localized PRBs on which frequency hopping is not performed. The distributed transmission type means UL control information transmission through frequency hopping applied on a symbol or a symbol group basis. In addition, the frequency resource allocation information of the UL control channel may include at least one of UL control channel format information and PRB allocation information for each UL control channel format.

For another example, the UL control channel transmission information may include at least one of UL control channel format information, UL control channel transmission type information, and priority information for each UL control channel format, configured for each UE. The UL control channel format information means information on a PUCCH format including the long PUCCH and the short PUCCH. The UL control channel transmission type information may mean information for indicating which of the distributed type and the localized type is applied. Further, the priority information for each UL control channel format means information for determining a format having a top priority which can be used when a UE transmits the UL control information, in case both the long PUCCH and the short PUCCH are configured for the UE. The UE may transmit UL control information using a PUCCH format having a top priority.

The transmitter 820 may transmit the configured information cell-specifically or UE-specifically to the UE. For one example, transmitter 820 may transmit the UL control channel resource set configuration information in advance for enabling the UE to transmit the UL control channel. For example, the transmitter 820 may transmit the UL control channel resource set configuration information through at least one of cell-specific high layer signaling, UE-specific high layer signaling, and a common search space of a DL control channel. The transmitter 820 may configure cell-specifically the UL control channel resource set configuration information and transmit it to the UE. For another example, the transmitter 820 may transmit the UL control channel transmission information together with or separately from the UL control channel resource set configuration information. The transmitter 820 may transmit the UL control channel transmission information through the UE-specific high layer signaling or the common search space of the DL control channel. That is, the UL control channel transmission information may be configured UE-specifically and transmitted to the UE.

The receiver 830 may receive the UL control channel configured by the UE using the information. The UL control channel includes the UL control information.

In addition, the controller 810 is configured to control the overall operations of the base station 800 for receiving UCI which is transmitted using a plurality of PUCCH formats in the NR according to the embodiments of the present disclosure described above.

In addition, the transmitter 820 and the receiver 830 are used to transmit, to the UE and receive from the UE, signals, messages, and data necessary for performing embodiments of the present disclosure.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

What is claimed is:

1. A wireless device, comprising:
a transmitter;
a receiver; and
a controller which controls the transmitter and the receiver in order to perform:
receiving, from a base station, a high layer signaling including physical uplink control channel (PUCCH) resource information and uplink (UL) control channel transmission information, wherein the PUCCH resource information in the high layer signaling includes PUCCH format information, which identifies a plurality of PUCCH formats, and wherein the plurality of PUCCH formats include a first PUCCH format using a first number of symbols and a second PUCCH format using a second number of symbols, wherein the second number of symbols is longer than the first number of symbols, and
transmitting, to the base station, a PUCCH including uplink control information (UCI) using at least one of the plurality of PUCCH formats, based on the PUCCH resource information, wherein, in case first control information in the first PUCCH format may be transmitted to the base station in a slot and second control information in the second PUCCH format may be transmitted to the base station in the slot, only control information in the second PUCCH format is transmitted as the UCI in the slot,
wherein an UL control channel including the UL control channel transmission information is configured based on at least one of the PUCCH resource information and the UL control channel transmission information,
wherein the base station serves a service area in which one of a plurality of wireless devices transmits and receives signals from other wireless devices,
wherein the UL control channel transmission information is configured for each wireless device of the plurality of wireless devices and includes at least one of UL control channel format information, UL control channel transmission type information and priority information for each PUCCH format, and
wherein, when allocation of an UL control region for a selected one of the plurality of PUCCH formats is not performed, the configuration of the UL control channel is performed through an UL control region for another PUCCH format having a resource index identical to an UL control channel resource index based on the selected PUCCH format.

2. The wireless device of claim 1, wherein the first number is one (1) or two (2).

3. The wireless device of claim 2, wherein the second number is one selected from four (4) to twelve (12).

4. The wireless device of claim 1, wherein the plurality of PUCCH formats are classified based on whether one or two symbols are to be used or whether four or more symbols are to be used.

5. The wireless device of claim 1, wherein the plurality of PUCCH formats are classified based on a payload size of the UCI.

6. The wireless device of claim 1,
wherein for the plurality of PUCCH formats, at least one PUCCH resource is configured, and
wherein the at least one PUCCH resource includes one or more physical resource blocks (PRBs).

7. The wireless device of claim 1, wherein the PUCCH resource information includes PRB allocation information.

8. The wireless device of claim 1, wherein the PUCCH resource information includes priority information for the plurality of PUCCH formats.

9. The wireless device of claim 1, wherein the UCI includes one or more among a hybrid automatic repeat request (HARQ) acknowledgement (ACK)/negative-acknowledgement (NACK), channel state information (CSI) and a scheduling request (SR).

10. The wireless device of claim 1, wherein the PUCCH resource information in the high layer signaling further includes transmission type information.

11. The wireless device of claim 10, wherein the transmission type information in the higher layer signaling includes information on whether frequency hopping is performed.

12. A base station, comprising:
a transmitter;
a receiver; and
a controller which controls the transceiver and the receiver in order to perform:
transmitting, to a wireless device, a high layer signaling including physical uplink control channel (PUCCH) resource information and uplink (UL) control channel transmission information, wherein the PUCCH resource information in the high layer signaling includes PUCCH format information, which identifies a plurality of PUCCH formats, and wherein the plurality of PUCCH formats include a first PUCCH format using a first number of symbols and a second PUCCH format using a second number of symbols, wherein the second number of symbols is longer than the first number of symbols, and
receiving, from the wireless device, a PUCCH including uplink control information (UCI) using at least one of the plurality of PUCCH formats, based on the PUCCH resource information, wherein, in case first control information in the first PUCCH format may be transmitted to the base station in a slot and second control information in the second PUCCH format may be transmitted to the base station in the slot, only control information in the second PUCCH format is transmitted as the UCI in the slot,
wherein an UL control channel including the UL control channel transmission information is configured based on at least one of the PUCCH resource information and the UL control channel transmission information,
wherein the base station serves a service area in which one of a plurality of wireless devices transmits and receives signals from other wireless devices,
wherein the UL control channel transmission information is configured for each wireless device of the plurality of wireless devices and includes at least one of UL control channel format information, UL control channel transmission type information and priority information for each PUCCH format, and
wherein, when allocation of an UL control region for a selected one of the plurality of PUCCH formats is not performed, the configuration of the UL control channel is performed through an UL control region for another PUCCH format having a resource index identical to an UL control channel resource index based on the selected PUCCH format.

13. The base station of claim 12, wherein the first number is one (1) or two (2).

14. A controller embedded in a wireless device, comprising:
a controller which controls a transmitter and a receiver of the wireless device in order to perform:
receiving, from a base station, a high layer signaling including physical uplink control channel (PUCCH) resource information and uplink (UL) control channel transmission information, wherein the PUCCH resource information in the high layer signaling includes PUCCH format information, which identifies a plurality of PUCCH formats, and wherein the plurality of PUCCH formats include a first PUCCH format using a first number of symbols and a second PUCCH format using a second number of symbols, wherein the second number of symbols is longer than the first number of symbols, and
transmitting, to the base station, a PUCCH including uplink control information (UCI) using at least one of the plurality of PUCCH formats, based on the PUCCH resource information, wherein, in case first control information in the first PUCCH format may be transmitted to the base station in a slot and second control information in the second PUCCH format may be transmitted to the base station in the slot, only control information in the second PUCCH format is transmitted as the UCI in the slot,
wherein an UL control channel including the UL control channel transmission information is configured based on at least one of the PUCCH resource information and the UL control channel transmission information,
wherein the base station serves a service area in which one of a plurality of wireless devices transmits and receives signals from other wireless devices,
wherein the UL control channel transmission information is configured for each wireless device of the plurality of wireless devices and includes at least one of UL control channel format information, UL control channel transmission type information and priority information for each PUCCH format, and
wherein, when allocation of an UL control region for a selected one of the plurality of PUCCH formats is not performed, the configuration of the UL control channel is performed through an UL control region for another PUCCH format having a resource index identical to an UL control channel resource index based on the selected PUCCH format.

15. The controller of claim 14, wherein the first number is one (1) or two (2).

16. The controller of claim 15, wherein the second number is one selected from four (4) to twelve (12).

17. The controller of claim 14, wherein the plurality of PUCCH formats are classified based on whether one or two symbols are to be used or whether four or more symbols are to be used.

18. A communication device, comprising:
a memory; and
a processor operably coupled to the memory,
wherein the processor is configured to:
cause the device to receive, from a base station, a message through an RRC signaling, the message comprising physical uplink control channel (PUCCH) resource information for a plurality of PUCCH formats and uplink (UL) control channel transmission information;
generate first uplink control information (UCI); and
cause the device to transmit, to the base station, the first UCI based on the PUCCH resource information, wherein the first UCI is transmitted using a first PUCCH format among the plurality of PUCCH formats,
wherein a second PUCCH format among the plurality of PUCCH formats uses a first number of symbols and the first PUCCH format uses a second number of symbols, wherein the first number of symbols is longer than the second number of symbols, and
wherein, in case first control information in the first PUCCH format may be transmitted to the base station in a slot and second control information in the second PUCCH format may be transmitted to the base station in the slot, only control information in the second PUCCH format is transmitted as the first UCI in the slot,
wherein an UL control channel including the UL control channel transmission information is configured based on at least one of the PUCCH resource information and the UL control channel transmission information,
wherein the base station serves a service area in which one of a plurality of communication devices transmits and receives signals from other communication devices,
wherein the UL control channel transmission information is configured for each communication device of the plurality of communication devices and includes at least one of UL control channel format information, UL control channel transmission type information and priority information for each PUCCH format, and
wherein, when allocation of an UL control region for a selected one of the plurality of PUCCH formats is not performed, the configuration of the UL control channel is performed through an UL control region for another PUCCH format having a resource index identical to an UL control channel resource index based on the selected PUCCH format.

19. The communication device of claim 18, wherein the processor is further configured to decide to transmit the first UCI at least based on a type of the first UCI.

20. A communication method, comprising:
receiving, from a base station, a message through an RRC signaling, the message comprising physical uplink control channel (PUCCH) resource information for a plurality of PUCCH formats and uplink (UL) control channel transmission information;
generating first uplink control information (UCI); and
transmitting, to the base station, the first UCI based on the PUCCH resource information,
wherein the first UCI is transmitted using a first PUCCH format among the plurality of PUCCH formats,
wherein a second PUCCH format among the plurality of PUCCH formats uses a first number of symbols and the first PUCCH format uses a second number of symbols, wherein the first number of symbols is longer than the second number of symbols, and
wherein, in case first control information in the first PUCCH format may be transmitted to the base station in a slot and second control information in the second PUCCH format may be transmitted to the base station in the slot, only control information in the second PUCCH format is transmitted as the first UCI in the slot, wherein an UL control channel including the UL control channel transmission information is configured based on at least one of the PUCCH resource information and the UL control channel transmission information, wherein the base station serves a service area in which one of a plurality of communication devices transmits and receives signals from other communication devices, wherein the UL control channel transmission information is configured for each communication device of the plurality of communication devices and includes at least one of UL control channel format information, UL control channel transmission type information and priority information for each PUCCH format, and wherein, when allocation of an UL control region for a selected one of the plurality of PUCCH formats is not performed, the configuration of the UL control channel is performed through an UL control region for another PUCCH format having a resource index identical to an UL control channel resource index based on the selected PUCCH format.

21. The method of claim 20, further comprising deciding to transmit the first UCI at least based on a type of the first UCI.

22. A communication device, comprising:
a memory; and
a processor operably coupled to the memory,
wherein the processor is configured to:
   cause the device to transmit, to a user equipment (UE), a message through an RRC signaling, the message comprising physical uplink control channel (PUCCH) resource information for a plurality of PUCCH formats and uplink (UL) control channel transmission information; and
   cause the device to receive, from the UE, first uplink control information (UCI) based on the PUCCH resource information, wherein the first UCI is received using a first PUCCH format among the plurality of PUCCH formats, wherein a second PUCCH format among the plurality of PUCCH formats uses a first number of symbols and the first PUCCH format uses a second number of symbols, wherein the first number of symbols is longer than the second number of symbols, and wherein, in case first control information in the first PUCCH format may be transmitted to the base station in a slot and second control information in the second PUCCH format may be transmitted to the base station in the slot, only control information in the second PUCCH format is transmitted as the first UCI in the slot, wherein an UL control channel including the UL control channel transmission information is configured based on at least one of the PUCCH resource information and the UL control channel transmission information, wherein the base station serves a service area in which one of a plurality of communication devices transmits and receives signals from other communication devices, wherein the UL control channel transmission information is configured for each communication device of the plurality of communication devices and includes at least one of UL control channel format information, UL control channel transmission type information and priority information for each PUCCH format, and wherein, when allocation of an UL control region for a selected one of the plurality of PUCCH formats is not performed, the configuration of the UL control channel is performed through an UL control region for another PUCCH format having a resource index identical to an UL control channel resource index based on the selected PUCCH format.

23. The communication device of claim 22, wherein the first UCI is determined to be transmitted at least based on a type of the first UCI.

* * * * *